United States Patent
Marino

(10) Patent No.: US 6,784,893 B2
(45) Date of Patent: Aug. 31, 2004

(54) RASTER OPERATION UNIT

(75) Inventor: Charles F. Marino, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 10/056,318

(22) Filed: Jan. 22, 2002

(65) Prior Publication Data

US 2003/0137520 A1 Jul. 24, 2003

(51) Int. Cl.[7] ................................................. G09G 5/37
(52) U.S. Cl. ..................................... 345/561; 345/629
(58) Field of Search ................................. 345/530–531, 345/589, 605–606, 603, 561–563, 629

(56) References Cited

U.S. PATENT DOCUMENTS

| | | | |
|---|---|---|---|
| 5,347,631 A | * | 9/1994 | Providenza et al. ........ 345/561 |
| 5,454,076 A | * | 9/1995 | Cain et al. .................. 345/557 |
| 5,870,085 A | | 2/1999 | Laksono |
| 5,892,890 A | * | 4/1999 | Clouthier et al. ............ 358/1.4 |
| 5,959,637 A | | 9/1999 | Mills et al. |
| 6,111,584 A | | 8/2000 | Murphy |
| 6,140,994 A | * | 10/2000 | Schaffstein et al. ......... 345/629 |
| 6,141,024 A | | 10/2000 | Laksono et al. |
| 6,230,235 B1 | * | 5/2001 | Lu et al. ..................... 711/106 |
| 6,456,404 B1 | * | 9/2002 | Furuya et al. .............. 358/523 |
| 6,707,457 B1 | * | 3/2004 | Bates ......................... 345/557 |

* cited by examiner

Primary Examiner—Kee M. Tung
(74) Attorney, Agent, or Firm—William H. Steinberg; Hoffman, Warnick & D'Alessandro LLC

(57) ABSTRACT

A method, graphics engine boolean logic unit and digital video system that provide a raster operation unit capable of providing a raster and non-raster operation function(s) is provided. The raster operation may simultaneously conduct a raster function and non-raster operation function(s) by modification of at least one of a rasterop code and a pattern operand. The invention saves considerable logic since different functions are no longer executed separately and then multiplexed.

17 Claims, 3 Drawing Sheets

RASTER OPERATION UNIT

BACKGROUND OF THE INVENTION

1. Technical Field

The present invention relates generally to a raster operation unit and, more particularly, to a raster operation unit that can perform a raster operation and non-raster operation function(s).

2. Related Art

Digital electronics and, in particular, digital video systems are becoming ubiquitous in today's electronic world. One industry, among many, in which digital video systems are becoming much more prevalent is television services. For instance, practically every television system now offers digital service, which requires a set top box having a digital video system. In this setting, the digital video system provides various functions relative to the digital television services such as television programming information, games, Internet browsing and other multimedia in a graphical format on a television display. A digital video system generally includes a processor, memory, a hardware graphics system for generating graphics, an application that provides system functionality including graphics creation, and an application program interface (API) for communicating between the application and graphics system. In operation, the digital video system application provides a request for generation of a graphic to the graphics system API, and the graphics system API would then generate register data for the graphics system using the digital video system processor.

A graphics engine includes a boolean logic unit that provides a number of functions relative to graphics generation. One common function is a raster operation, which is conducted by a raster operation unit. Other functions may include, for example, a color key operation, a pixel bit mask operation, a pattern write mask operation and a pixel boundary modify write operation. Conventionally, each function is provided serially by a respective operation unit. That is, each function would occur serially prior to or after the raster operation. Alternatively, each function may occur in parallel with the raster operation. This arrangement is very inefficient since each function requires its own logic. In addition, additional logic is required to multiplex the results of each function. For example, if a color key operation (CKOP) were configured to replace a destination pixel only if the color key does not compare, then a 2:1 multiplexor is required to select the source pixel (CKOP false) or destination pixel (CKOP true). Further multiplexing would be required for each function and each of the different pixel formats, e.g., red-green-blue (RGB) 32, RGB 16, color-lookup-table (CLUT) 4, CLUT 8, monochrome, etc. Where seven different RGB pixel formats are supported by a graphics engine, for example, this equates to a significant amount of logic.

In view of the foregoing, there is a need in the art for a way to perform the various functions more efficiently and use less logic.

SUMMARY OF THE INVENTION

A method, graphics engine boolean logic unit and digital video system that provide a raster operation unit capable of providing non-raster operation functions is provided. The raster operation may also simultaneously conduct a raster function and non-raster operation functions by modification of at least one of a rasterop code and a pattern operand. The invention saves considerable logic since different functions are no longer executed separately and then multiplexed.

A first aspect of the invention is directed to a method of conducting a non-raster operation function using a raster operation unit that receives a first operand, a second operand, a pattern operand and a rasterop code, the method comprising the steps of: modifying at least one of the rasterop code and the pattern operand to implement the non-raster operation function; and executing on the first operand, the second operand and the pattern operand according to the rasterop code using the raster operation unit to generate resulting pixel data.

A second aspect of the invention includes a graphics engine boolean logic unit comprising: a raster operation unit that executes on a first operand, a second operand and a pattern operand according to a rasterop code; and a rasterop input modifier that modifies at least one of the pattern operand and the rasterop code to execute a non-raster operation function using the raster operation unit.

A third aspect of the invention is directed to a digital video system comprising: a processor; a memory; an application; a graphics system for generating graphics, the graphics system including a graphics engine boolean logic unit including: means for conducting a raster operation on a first operand, a second operand and a pattern operand according to a rasterop code; and means for modifying at least one of the pattern operand and the rasterop code to execute a non-raster operation function using the means for conducting.

The foregoing and other features and advantages of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

For convenience purposes only, the following subtitles have been provided:

I. Digital Video System Overview
II. Graphics Engine/Boolean Logic Unit
III. Rasterop Input Modifier
IV. Method

I. Digital Video System Overview

Figure 1:
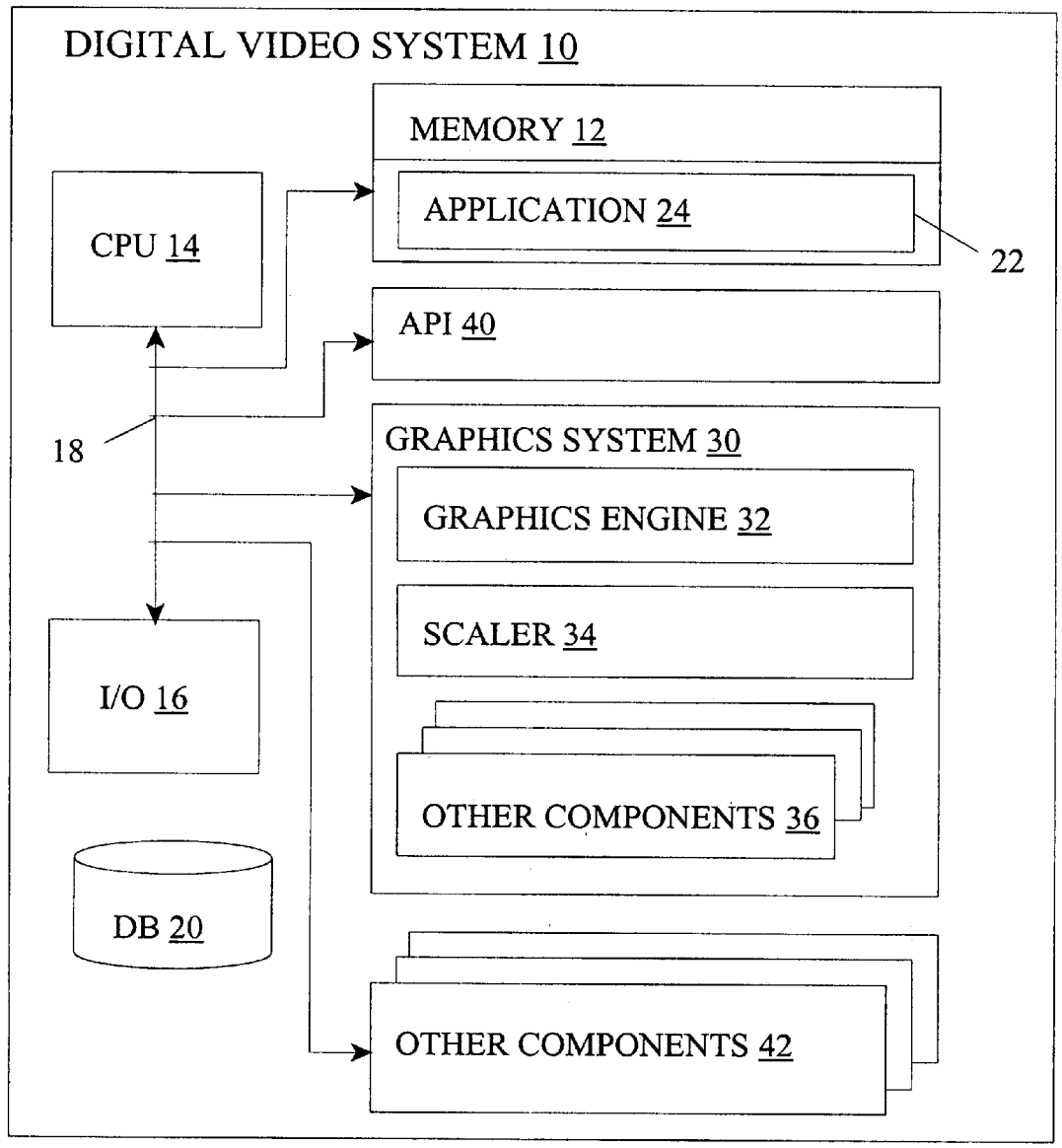
FIG. 1 shows a block diagram of a digital video system.

FIG. 1 is a block diagram of a digital video system 10. Digital video system 10 includes a memory 12, a processor (CPU) 14, input/output devices (I/O) 16 and a bus 18. A database 20 may also be provided for storage of data relative to processing tasks. Memory 12 includes a program product 22 that, when executed by CPU 14 comprises various functional capabilities of system 10. Memory 12 (and database 20) may comprise any known type of data storage system and/or transmission media, including magnetic media, optical media, random access memory (RAM), read only memory (ROM), a data object, etc. Moreover, memory 12 (and database 20) may reside at a single physical location comprising one or more types of data storage, or be distributed across a plurality of physical systems.

Processor 14 may likewise comprise a single processing unit, or a plurality of processing units distributed across one or more locations. In one embodiment, digital video system 10 is a set top box configured to provide various digital television service functionality including generating graphics for overlay in a television display. In this setting, processor 14 may comprise an IBM PowerPC® CPU. Processor 14 is designed to drive the operation of the particular hardware and is compatible with other system components and I/O controllers. I/O 16 may comprise any known type of input/output device including a network system, modem, keyboard, mouse, scanner, voice recognition system, CRT, printer, disc drives, cable system, etc.

Program product 22 may include an application 24 that provides the various functional capabilities of digital video system 10. Application 24 may be customized to user preferences.

Digital video system 10 also includes a graphics system 30 that includes a graphics engine 32. Graphics engine 32 is hardware that performs graphics processing tasks based on requests from application 24. Graphics system 30 may also include a scaler 34 and other components 36 as known in the art and as may be necessary for graphics generation. An application program interface (API) 40 may be provided for communication between application 24 and graphics system 30. Additional components 42, such as cache memory, communication systems, digital-analog encoder, etc., may also be incorporated into system 10.

II. Graphics Engine/Boolean Logic Unit

Figure 2:
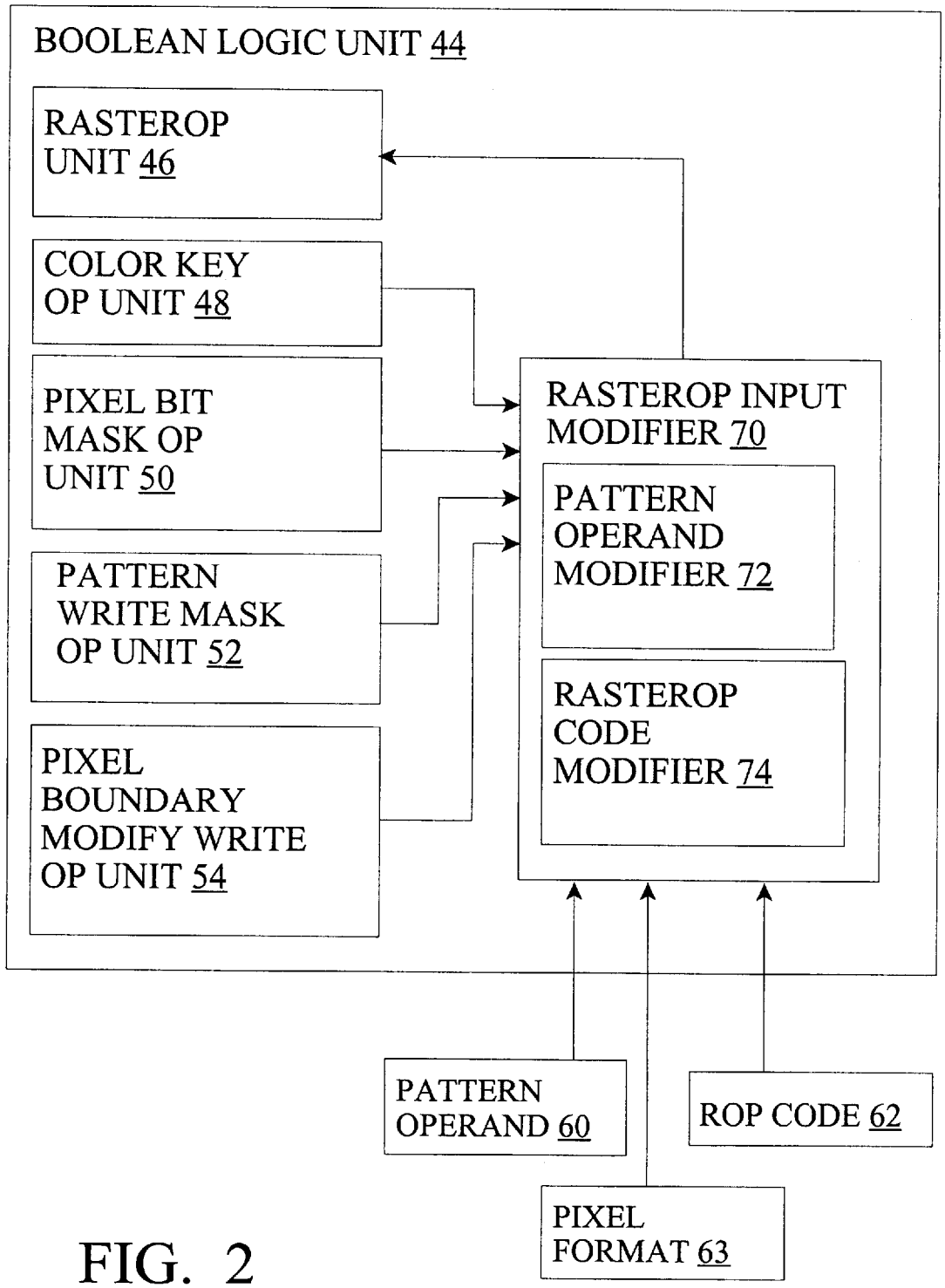
FIG. 2 shows a block diagram of a graphics engine boolean logic unit including a rasterop input modifier.

Referring to FIG. 2, graphics engine 32 includes a boolean logic unit (BLU) 44. BLU 44 can provide a number of functions. One particular function is a raster operation, which is provided by a raster operation unit 46 (hereinafter referred to as a "rasterop unit"). BLU 44 may also provide a number of non-raster operation (hereinafter "non-ROP") functions conducted by operation units 48–54. Exemplary non-ROP function units include: a color key operation unit 48, a pixel bit mask operation unit 50, a pattern write mask operation unit 52 and a pixel boundary modify write operation 54.

Figure 3:
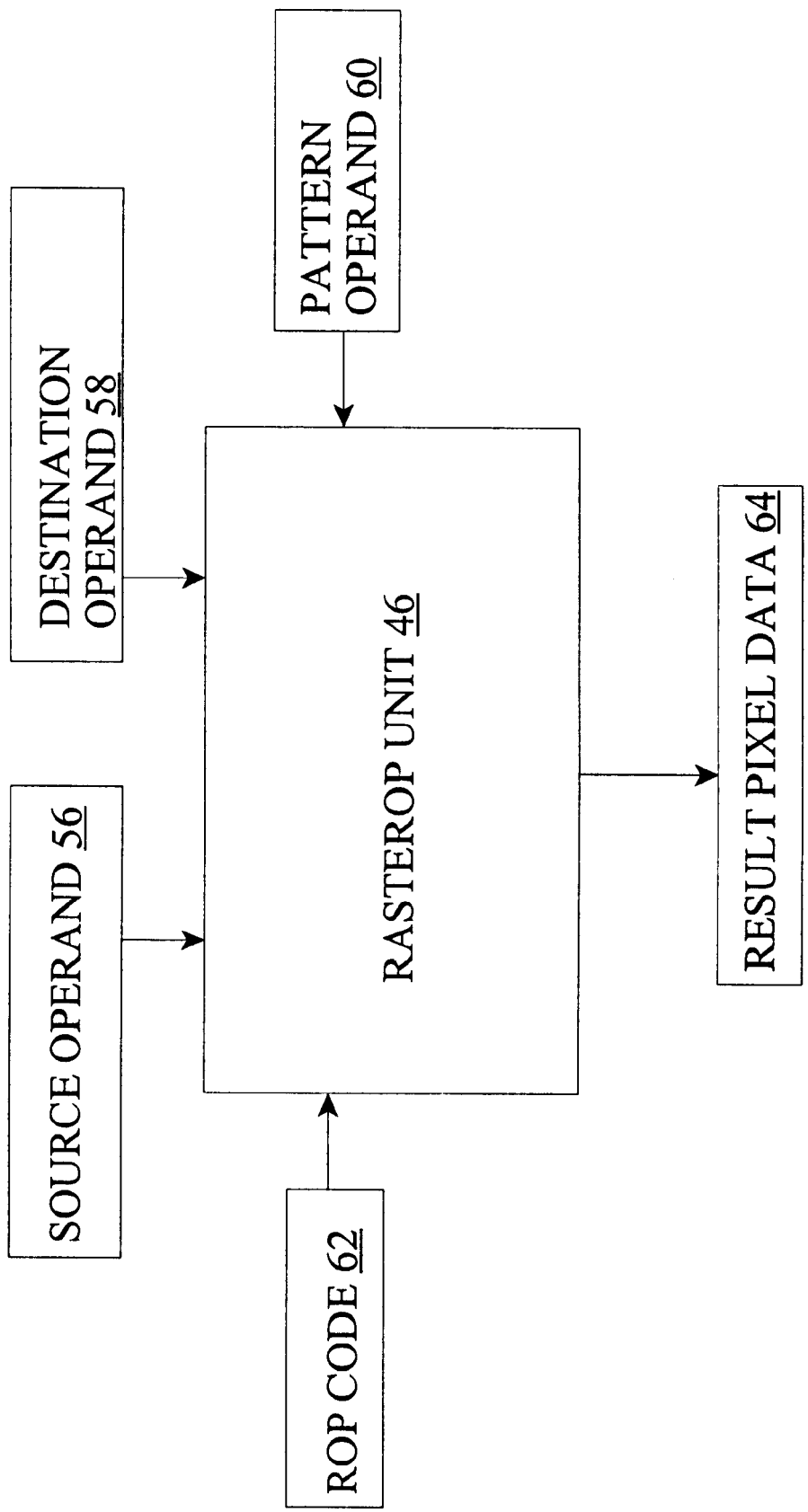
FIG. 3 shows a block diagram of a raster operation unit and inputs.

As shown in FIG. 3, rasterop unit 46 executes on four inputs: source operand 56, destination operand 58, a pattern operand 60 and a rasterop code (ROP code) 62. Rasterop unit 46 has resulting pixel data 64 as its only output. Source operand 56 is pixel data representing a source or base image. Destination operand 58 is pixel data that may represent image data to be combined with the source operand. Pattern operand 60 is pixel data that instructs BLU 44 how to create a pattern effect on source and/or destination pixels to form resulting pixel data, i.e., a resulting image. The pattern operand is 1 bit/pixel. Pattern operand 60 may be recalled from memory, e.g., memory 12 or database 20. ROP code 62 is an 8-bit code that instructs rasterop unit 46 how the three operands, i.e., source, destination and pattern operands, are to be manipulated logically using boolean operators, e.g., zero, inverse, AND, OR, exclusive OR, set, etc. In other words, rasterop unit 46 executes on first operand 56, second operand 58 and pattern operand 60 according to ROP code 62. In this setting, there are 256 possibilities or operations that can be conducted on the three operands. Rasterop code 62 may be selected by, for example, API 40 or another graphics system API (not shown) as known in the art.

In one embodiment, rasterop unit 46 is designed to operate as 32 independent 1 bit processing elements, and each of source operand 56, destination operand 58 and pattern operand 60 are 32-bits. Accordingly, rasterop unit 46 executes on all 32 bits on every clock cycle, and each of the five BLU functions are performed bit-wise.

As a simplified example, a raster operation may include the combination of a source operand of a wood grain texture with a destination operand of an image of the sun. The pattern operand may include a pattern of window lattices, e.g., black where a surrounding wall is located and clear where glass is located. Using rasterop unit 46, an image of a window having wood grain lattices and the sun shining therethrough can be built.

With regard to the exemplary non-ROP functions, a color key operation unit replaces one operand, e.g., source operand, with another operand, e.g., destination operand, when a condition exists. A simple color key operation is exemplified by the blue screen technique used in weatherman presentations. In this setting, a weatherman can be overlayed on a weathermap (destination image) that replaces the weatherman with blue screen (source image) when a condition, i.e., the blue screen behind the weatherman, exists.

Pixel bit mask operation unit 50 provides a way by which pixel data can be tagged for updating or left untouched. In this setting, a bit mask register exists that has a bit for every pixel location, e.g., if 32 bits=32 bit mask. A bit that is 'on' (1), may indicate to BLU 44 to allow updating of that pixel, while a bit that is 'off' (0), may indicate leaving the pixel untouched.

Pattern write mask operation unit 52 takes a pixel bit mask and extends it to all bits of a pixel, i.e., it overwrites, for example, 32 bits to be one. In this case, there is one bit for the whole pixel set of a bit mask. If the bit is 'on' (1), then the whole pixel can be updated; if the bit is 'off' (0), then the whole pixel cannot be updated.

Pixel boundary modify write operation unit 54 addresses the situation where pixel data is not in multiples that BLU 44 is set up to operate on. For instance, BLU 44 may be set up to operate on 32 bits, i.e., the graphics engine is a 32 bit pipe. In some cases, the graphics engine may be outputting 32 bits, but may not want to change all 32 bits. As an example, a rectangle that is 37 pixels wide with 1 bit/pixel may be operated on. In this case, the first 32 bits will be modified because of the 32 bit graphic engine, leaving 5 other bits. To prevent manipulation of the other 27 bits beyond the five remaining, a boundary condition is detected. In this case, only the remaining 5 bits are updated.

III. Rasterop Input Modifier

In conventional systems, each operation unit 46–54 would conduct its respective operation and the results would be multiplexed (multiplexor not shown). In order to reduce the logic required for this serial operation and multiplexing, as shown in FIG. 2, graphics engine boolean logic unit (BLU) 44 includes a rasterop input modifier 70. Modifier 70 is operable to modify at least one of pattern operand 60 and ROP code 62 to execute a non-ROP function using rasterop unit 46. In other words, by modifying pattern operand 60 and/or ROP code 62, rasterop unit 46 can be instructed to execute a raster function and non-ROP function(s) normally conducted by operation units 48–54 (FIG. 2). As a result, the amount of logic required for those operation units and multiplexing results is reduced. Modification can be made to implement any one of the non-ROP functions alone or any combination. In addition, modification also allows simultaneously implementing of a raster function and non-ROP function(s) using rasterop unit 46.

Inputs to modifier 70 may include a color key operation and a color key compare value; a pixel bit mask operator; a pattern write mask; and a boundary condition. Although illustrated as being submitted by respective operation units 48–54, the above values may be submitted by API 40 or another API (not shown), be pulled from memory, or calculated by a respective operation unit 48–54. Where no operations are necessary to ascertain an appropriate value(s) for a particular non-ROP function, a particular operation unit 48–54 may be omitted. In addition to the above values, a pixel format 63, e.g., RGB 32, from API 40 is inputted to modifier 70.

An exemplary operation of BLU 44 may be made relative to a color key operation. In this example, a color key compare is used to modify pattern operand 60. Returning to the above blue screen technique example, rather than color key operation unit 48 executing on pixel data to replace the blue screen with the weathermap image, pattern operand 60 is modified to replace the blue screen with a weathermap image. When rasterop unit 46 executes, the appropriate source operand, destination operand or pattern is selected using the pattern operand. That is, rasterop unit 46 is instructed using pattern operand 60 to implement the same color key change. For example, if the color key compare is true (i.e., the condition exists and the source operand is to be replaced with the destination operand), then a corresponding pattern operand bit is forced to '0.' Similarly, if the color key compare is false (i.e., the source operand is not to be replaced), then the corresponding pattern operand bit is unchanged. ROP code 62 will be programmed by the API to instruct rasterop unit 46 not to modify the destination operand if the pattern operand is off (0).

In a similar fashion to above, a non-ROP function can be implemented by changing ROP code 62 to change how raster operation unit 46 is instructed to logically manipulate data. For instance, under normal circumstances ROP code 62 may instruct rasterop unit 46 to select source operand if pattern operand 60 is 'on' (1) and destination operand if pattern operand is 'off' (0), i.e., using the pattern operand as a mask. However, ROP code 62 can be modified to logically manipulate data in other fashions. For example, if pattern operand is 'on' (1), then rasterop unit 46 may be instructed to AND source and destination operands, and otherwise leave the pixel data unchanged. Hence, modification of ROP code 62 may also be used to simultaneously implement non-ROP functions.

Modifier 70 may be implemented as a single unit or, as shown in FIG. 2, may be implemented as a rasterop code modifier 72 and a pattern operand modifier 74.

Although the invention has been described relative to a 32 bit pixel format, graphics engine 32 is operable on many different pixel formats, e.g., 1, 4, 8, 16 and 32 bits/pixel formats. As a result, 32 1-bit pixels may be executed every cycle, or eight 4-bit pixels, or four 8-bit pixels, etc.

Using the above invention, the amount of logic necessary to implement graphics functions and multiplexing results can be reduced. For example, modification of a 1 bit/pixel pattern operand is easier compared to all 32 bits/pixel.

IV. Method

The invention also includes a method of conducting a non-ROP function using a raster operation unit that receives a first operand, a second operand, a pattern operand and a rasterop code, as described above. The method comprises the steps of: modifying at least one of the rasterop code and the pattern operand to implement the non-ROP function; and executing on the first operand, the second operand and the pattern operand according to the rasterop code to generate resulting pixel data. The method may also include modifying the rasterop code and the pattern operand. The non-ROP function includes at least one of a color key operation, a pixel bit mask operation, a pattern write mask operation and a pixel boundary modify write operation. In addition to the non-ROP function, the step of modifying may include modifying at least one of the rasterop code and the pattern operand to simultaneously implement a raster function.

In the previous discussion, it will be understood that the method steps discussed are performed by a processor, such as CPU 14 of system 10, or hardware logic, such as graphics engine 32 executing instructions. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. Hardware described above may also be provided as separate entities accessible to system 10. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method of conducting a non-raster operation function using a raster operation unit capable of performing two-dimensional Boolean logic operations that receives a first operand, a second operand, a pattern operand and a rasterop code, the method comprising the steps of:

modifying at least one of the rasterop code and the pattern operand to implement the non-raster operation function; and executing on the first operand, the second operand and the pattern operand according to the rasterop code using the raster operation unit to generate resulting pixel data.

2. The method of claim 1, wherein the step of modifying includes modifying the rasterop code and the pattern operand.

3. The method of claim 1, wherein the non-raster operation function includes at least one of a color key operation, a pixel bit mask operation, a pattern write mask operation and a pixel boundary modify write operation.

4. The method of claim 1, wherein the step of modifying includes modifying at least one of the rasterop code and the pattern operand to simultaneously implement a raster function.

5. The method of claim 4, wherein the non-raster operation function includes at least one of a color key operation, a pixel bit mask operation, a pattern write mask operation and a pixel boundary modify write operation.

6. A graphics engine boolean logic unit comprising:

a raster operation unit capable of performing two-dimensional Boolean logic operations that executes on a first operand, a second operand and a pattern operand according to a rasterop code; and a rasterop input modifier that modifies at least one of the pattern operand and the rasterop code to execute a non-raster operation function using the raster operation unit.

7. The unit of claim 6, wherein the rasterop input modifier modifies the rasterop code and the pattern operand.

8. The unit of claim 6, wherein the non-raster operation function includes at least one of a color key operation, a pixel bit mask operation, a pattern write mask operation and a pixel boundary modify write operation.

9. The unit of claim 6, wherein the rasterop input modifier modifies at least one of the rasterop code and the pattern operand to simultaneously implement a raster function.

10. The unit of claim 9, wherein the non-raster operation function includes at least one of a color key operation, a pixel bit mask operation, a pattern write mask operation and a pixel boundary modify write operation.

11. The unit of claim 6, wherein the rasterop input modifier includes a rasterop code modifier and a pattern operand modifier.

12. A digital video system comprising:

a processor;

a memory;

an application;

a graphics system for generating graphics, the graphics system including a graphics engine boolean logic unit capable of performing two-dimensional Boolean logic operations including:

means for conducting a raster operation on a first operand, a second operand and a pattern operand according to a rasterop code; and means for modifying at least one of the pattern operand and the rasterop code to execute a non-raster operation function using the means for conducting.

13. The system of claim 12, wherein the means for modifying modifies the rasterop code and the pattern operand.

14. The system of claim 12, wherein the non-raster operation function includes at least one of a color key operation, a pixel bit mask operation, a pattern write mask operation and a pixel boundary modify write operation.

15. The system of claim 12, wherein the means for modifying modifies at least one of the rasterop code and the pattern operand to simultaneously implement a raster function.

16. The system of claim 15, wherein the non-raster operation function includes at least one of a color key operation, a pixel bit mask operation, a pattern write mask operation and a pixel boundary modify write operation.

17. The system of claim 12, wherein the means for modifying includes means for modifying the rasterop code and means for modifying the pattern operand.

\* \* \* \* \*